UNITED STATES PATENT OFFICE.

JULIETTE B. STRONG, OF MINNEAPOLIS, MINNESOTA.

COSMETIC.

SPECIFICATION forming part of Letters Patent No. 427,202, dated May 6, 1890.

Application filed February 21, 1890. Serial No. 341,354. (No specimens.)

*To all whom it may concern:*

Be it known that I, JULIETTE B. STRONG, a citizen of the United States, residing at Minneapolis, in the county of Hennepin and State of Minnesota, have invented certain new and useful Improvements in Cosmetics; and I do hereby declare the following to be a full, clear, and exact description of the invention, such as will enable others skilled in the art to which it appertains to make and use the same.

My invention has for its object to provide an efficient cosmetic which will soften, smooth, and add a glow to the skin, beautifying the complexion without any injurious effects. To this end I make a solution preferably comprising glycerine, pulverized chalk, bay rum, Jamaica rum, camphor, and soft water. I preferably use distilled water, to which is added some suitable perfume, such as the scent of roses. The proportions of these different ingredients for a pint of the mixture are, approximately, three ounces of bay rum, two ounces of pulverized chalk, two drams of glycerine, and a half-teaspoonful of Jamaica rum and camphor, to which is added a sufficient quantity of distilled water to make up the pint. The whole is then thoroughly commingled and is ready for use. It is applied in the customary way as a wash to the skin. A sponge should be used to apply the mixture, and the skin should then be rubbed with a chamois-skin.

The Jamaica rum and camphor can be omitted without destroying the cosmetic; but the addition of these two ingredients improves the solution, causing it to add a softening effect and a glow to the skin.

It will be noted that there is nothing but simple and harmless ingredients in this mixture. It may be applied freely without danger of any deleterious effects.

Experience has demonstrated that this cosmetic is highly serviceable in beautifying the complexion. It leaves so little traces that its presence cannot be detected.

It should be noted that the exact proportions of the specified ingredients may be varied to some extent without destroying the utility of the mixture.

What I claim, and desire to secure by Letters Patent, is as follows:

1. A cosmetic comprising glycerine, pulverized chalk, bay rum, and soft water, forming a solution, substantially as and for the purpose specified.

2. A cosmetic comprising glycerine, pulverized chalk, Jamaica rum, camphor, bay rum, and soft water, in the proportions substantially as set forth.

In testimony whereof I affix my signature in presence of two witnesses.

JULIETTE B. STRONG.

Witnesses:
JAS. F. WILLIAMSON,
EMMA F. ELMORE.